(12) United States Patent
Matsumoto

(10) Patent No.: US 11,036,617 B2
(45) Date of Patent: Jun. 15, 2021

(54) SEQUENCE PROGRAM PROCESSOR USED FOR TRACING OF SEQUENCE PROGRAM

(71) Applicant: FANUC CORPORATION, Yamanashi (JP)

(72) Inventor: Akihiro Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/774,607

(22) Filed: Jan. 28, 2020

(65) Prior Publication Data
US 2020/0278917 A1   Sep. 3, 2020

(30) Foreign Application Priority Data

Feb. 28, 2019   (JP) .............................. JP2019-036256

(51) Int. Cl.
| | | |
|---|---|---|
| G06F 9/44 | (2018.01) | |
| G06F 11/36 | (2006.01) | |
| G06F 11/34 | (2006.01) | |
| G06F 11/32 | (2006.01) | |

(52) U.S. Cl.
CPC ........ *G06F 11/3636* (2013.01); *G06F 11/323* (2013.01); *G06F 11/3409* (2013.01); *G06F 11/3471* (2013.01)

(58) Field of Classification Search
None
See application file for complete search history.

(56) References Cited

U.S. PATENT DOCUMENTS

| | | | | |
|---|---|---|---|---|
| 6,249,906 B1* | 6/2001 | Levine | .................. | G06F 8/4442 |
| | | | | 717/153 |
| 10,698,792 B2* | 6/2020 | Nelson | ................ | G06F 11/3664 |
| 2010/0235686 A1* | 9/2010 | Sato | .................... | G06F 11/3471 |
| | | | | 714/45 |

(Continued)

FOREIGN PATENT DOCUMENTS

| | | |
|---|---|---|
| JP | 02-306307 A | 12/1990 |
| JP | 04-235603 A | 8/1992 |

(Continued)

OTHER PUBLICATIONS

Notification of Reasons for Refusal dated Apr. 27, 2021 in JP Patent Application No. 2019-036256.

*Primary Examiner* — Qamrun Nahar
(74) *Attorney, Agent, or Firm* — Wenderoth, Lind & Ponack, L.L.P.

(57) ABSTRACT

A program editor includes a compile unit that analyzes an address of an instruction between a trace start position and a trace end position set in a sequence program by a program editing unit, inserts a transfer instruction about transferring a signal value to a tracing memory, and converts the sequence program to an object code of the sequence program containing a sampling address table in which the analyzed address is set and an execution program. A programmable controller includes: a sampling address setting unit that sets a sampling address in the tracing memory on the basis of the sampling address table in the object code of the sequence program; and a code execution unit that executes the object code of the sequence program and stores the signal value in the tracing memory in accordance with the transfer instruction.

6 Claims, 12 Drawing Sheets

(56) References Cited

U.S. PATENT DOCUMENTS

2012/0260135 A1* 10/2012 Beck .................. G06F 11/323
 714/45
2013/0091387 A1* 4/2013 Bohnet ............... G06F 11/3644
 714/38.1

FOREIGN PATENT DOCUMENTS

| JP | 3892873 | 3/2007 |
| JP | 2009-289131 A | 12/2009 |
| JP | 2018-005453 A | 1/2018 |

* cited by examiner

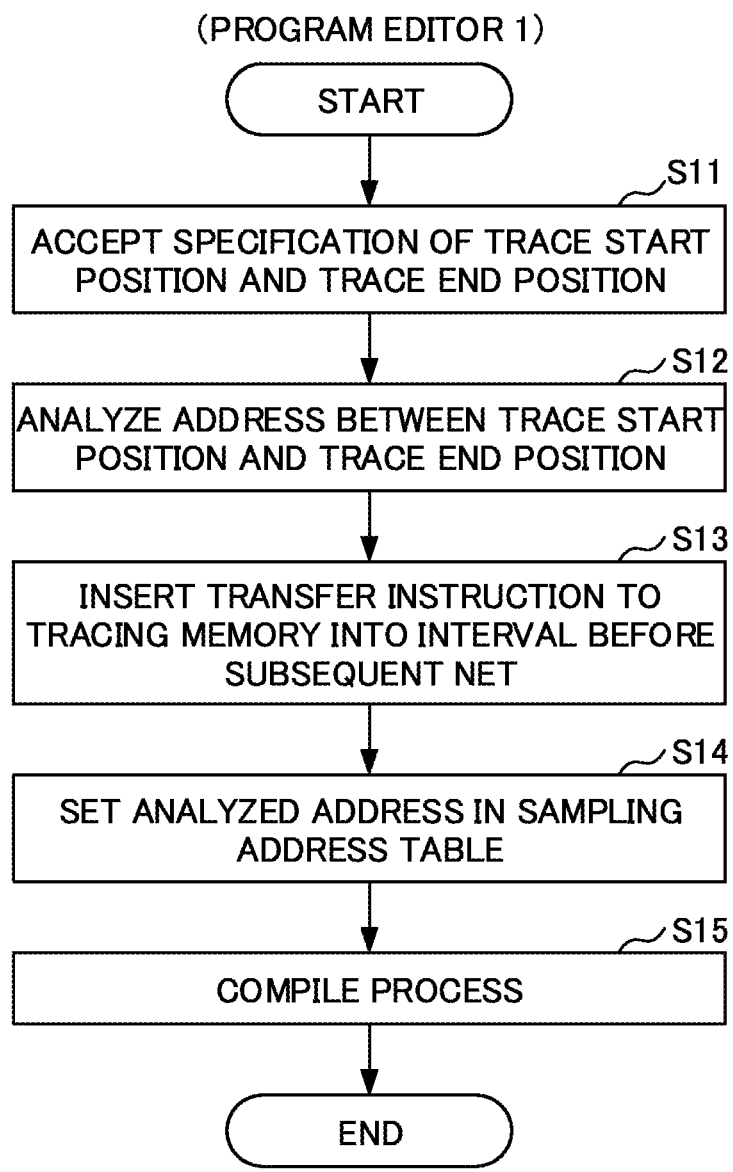

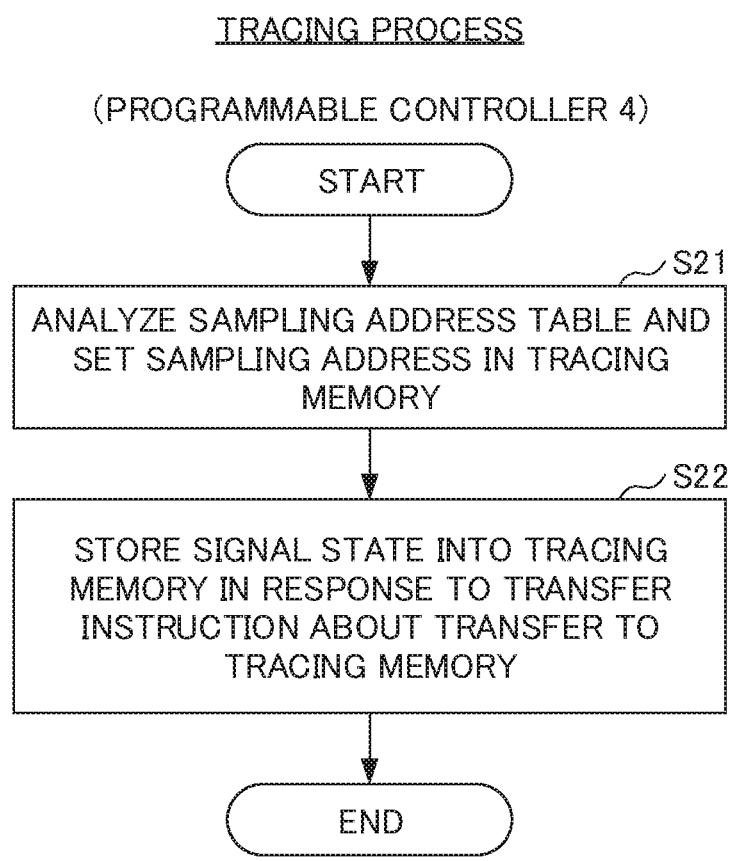

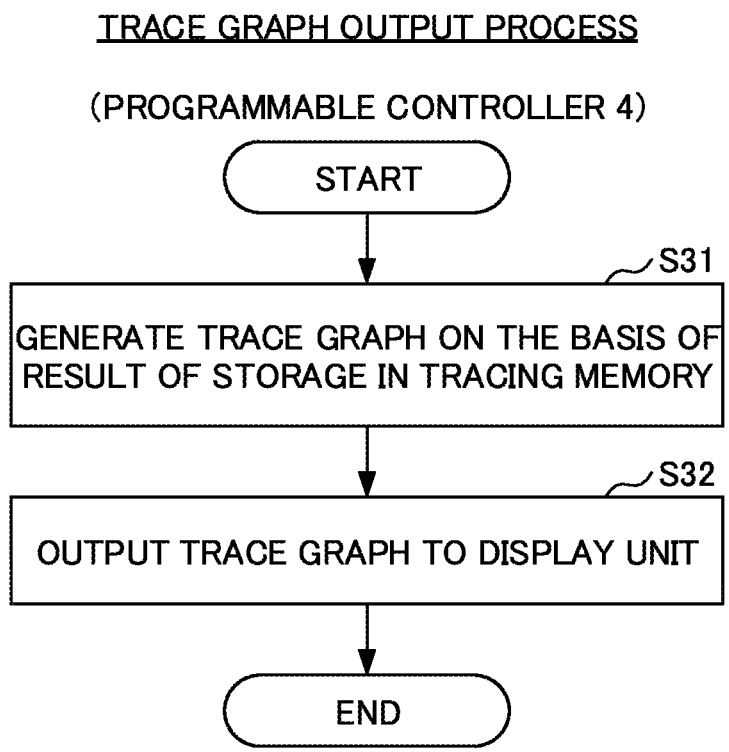

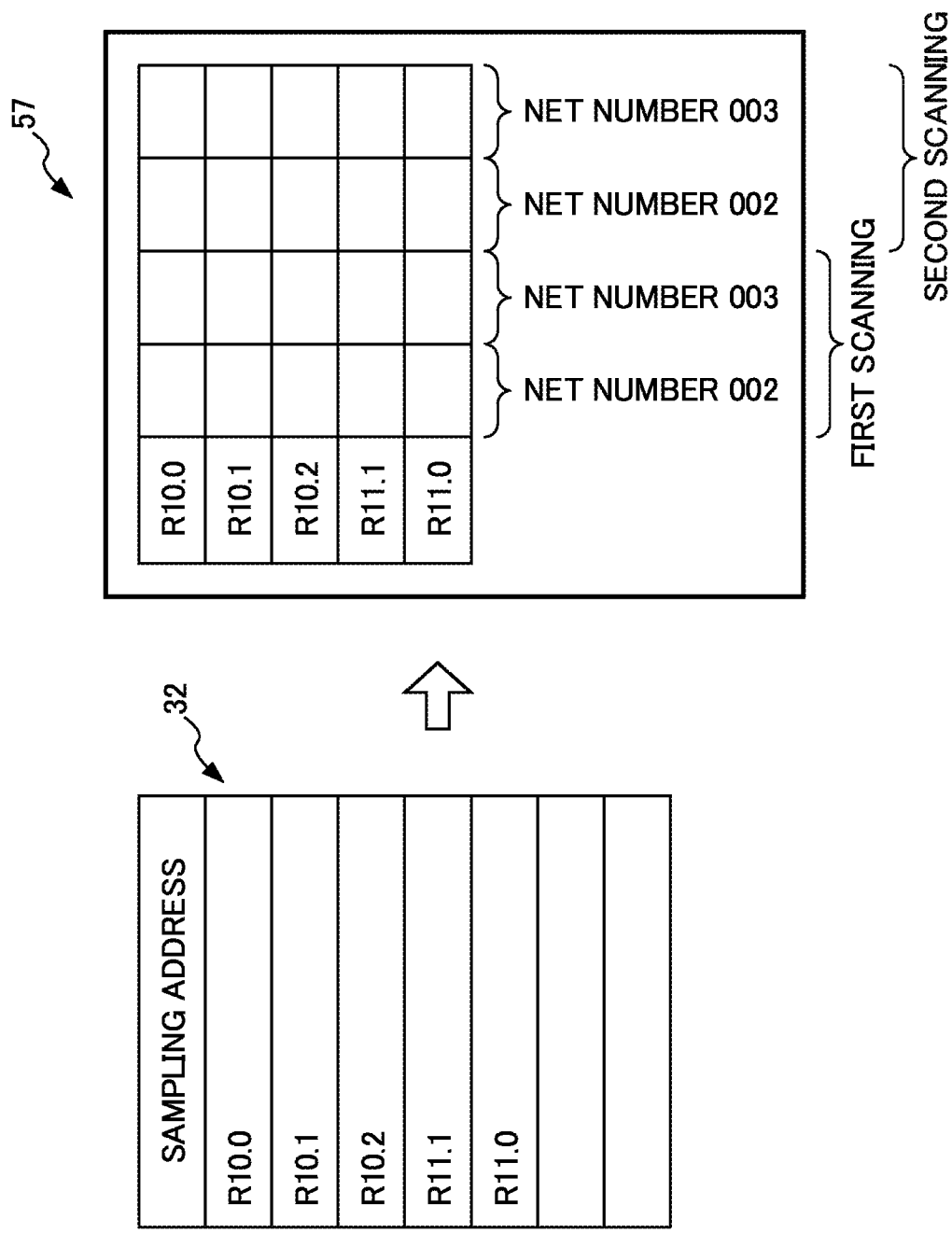

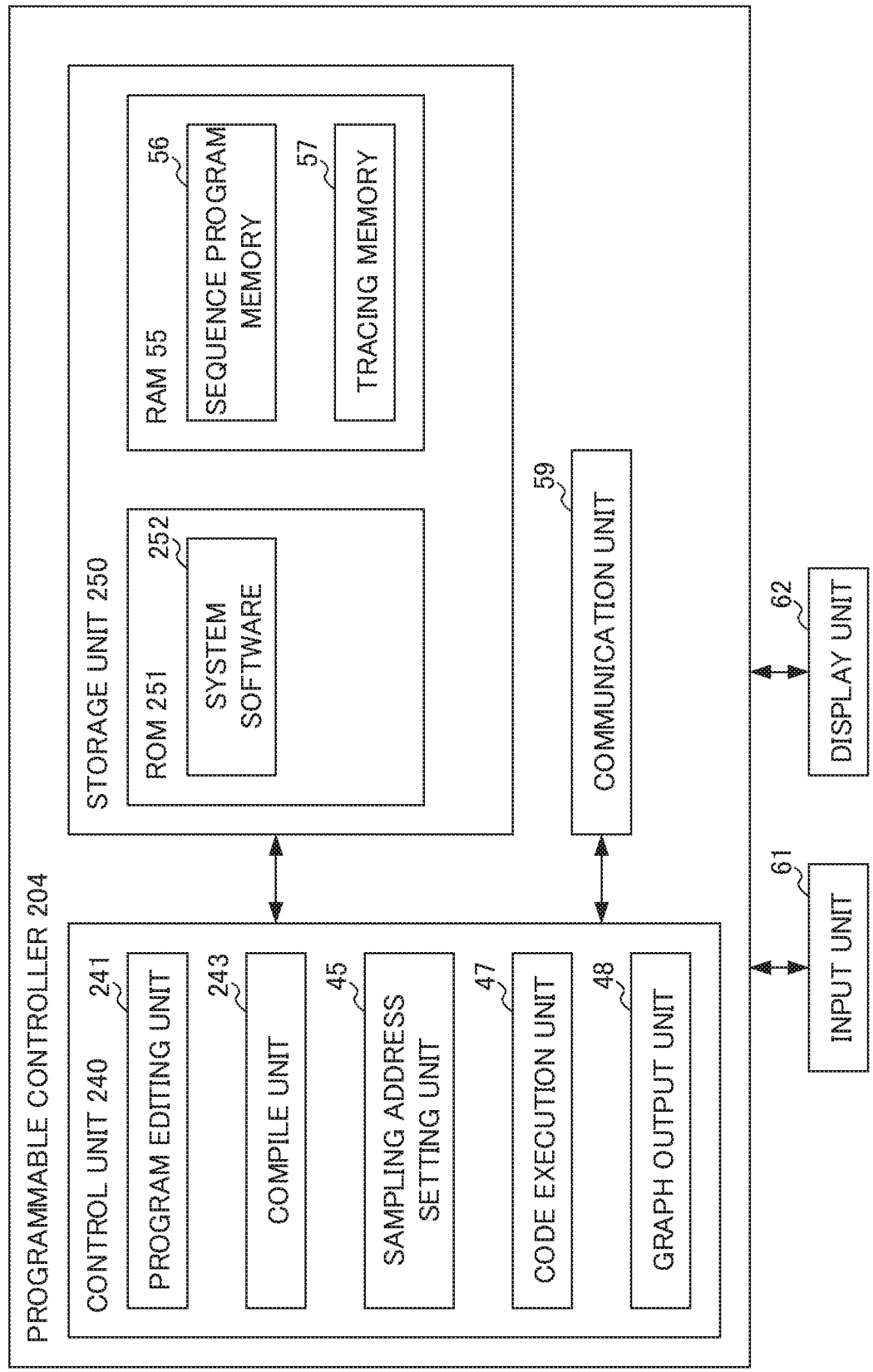

SEQUENCE PROGRAM PROCESSOR USED FOR TRACING OF SEQUENCE PROGRAM

This application is based on and claims the benefit of priority from Japanese Patent Application No. 2019-036256, filed on 28 Feb. 2019, the content of which is incorporated herein by reference.

BACKGROUND OF THE INVENTION

Field of the Invention

The present invention relates to a sequence program processor used for tracing of a sequence program.

Related Art

For debugging or maintenance of a sequence program, a tracing function has recently been provided to a programmable controller (also called PLC). The tracing function is for sampling, generally at the time of start and end of a sequence program or during the execution of all instructions. A sampling target may be a specified address (variable) or all addresses (variables) or may be determined by specifying an address (variable) displayed on a monitor. If the timing of sampling coincides with the start and end of the sequence program, however, a sampling target is limited only to a result of the execution of the sequence program. This disables sampling on the occurrence of signal change in the sequence program such as a signal change between ON and OFF within one cycle.

There has been a known programmable controller including a program memory storing a sequence program, a data memory storing data necessary for control, a microprocessor for executing the sequence program and for overall control, and a data tracing circuit that monitors an address signal, a data signal, and a command signal on a microprocessor bus during the execution of a monitoring range in the sequence program and samples and stores operand data in a sequence instruction coinciding with the timing of access to the operand data (Patent Document 1, for example). In this programmable controller, the operand data used at the time of execution of the sequence program by the microprocessor is stored at the time of occurrence of access to the data memory. When a monitor device displays the monitoring range in the sequence program, the contents of the operand data are displayed together with the sequence instruction to allow monitoring of real data at the time of execution of the sequence program. In the foregoing programmable controller, however, sampling is done during the execution of all instructions in the sequence program. This unintentionally results in the sampling of an unnecessary part, causing a problem of an extension of the cycle time of the sequence program. Furthermore, if a sampling target is a designated address (variable), analyzing the sequence program and identifying an address (variable) necessary for sampling is required. Hence, it becomes difficult to select a sampling target. On the other hand, defining all addresses (variables) as a sampling target unintentionally results in the sampling of an unnecessary address, causing a problem of an extension of the cycle time of the sequence program. In this regard, an address (variable) displayed on a monitor may be defined as a sampling target. In this case, however, a sampling target is limited only to the address displayed on the monitor.

Patent Document 1: Japanese Patent No. 3892873

SUMMARY OF THE INVENTION

Thus, a mechanism for making a signal state traceable at an arbitrary position in a sequence program has been desired.

(1) One aspect of this disclosure is intended for a sequence program processor that executes an object code of a sequence program stored in a program memory. The sequence program processor includes a program editor and a programmable controller. The program editor includes: a program editing unit capable of setting a pair of a trace start position and a trace end position in the sequence program; and a compile unit that analyzes an address of an instruction between the trace start positron and the trace end position set by the program editing unit, inserts a transfer instruction about transferring a signal value to a tracing memory, and sets the analyzed address in a sampling address table, thereby converting the sequence program to the object code of the sequence program containing an execution program and the sampling address table. The programmable controller includes: a sampling address setting unit that sets a sampling address in the tracing memory on the basis of the sampling address table contained in the object code of the sequence program resulting from the conversion by the compile unit; and a code execution unit that executes the object code of the sequence program and stores the signal value in the tracing memory in accordance with the transfer instruction.

(2) According to one aspect of this disclosure, in the sequence program processor described in (1), the programmable controller includes the program editor.

According to one aspect, a sequence program processor making a signal state traceable at any arbitrary position in a sequence program can be provided.

BRIEF DESCRIPTION OF THE DRAWINGS

FIG. 2 is a flowchart showing a program editing process performed by a program editor according to the embodiment;

FIG. 6A is a flowchart showing a tracing process performed by a programmable controller according to the embodiment;

FIG. 6B is a flowchart showing a trace graph output process performed by the programmable controller according to the embodiment;

FIG. 7 is a view for describing a process performed by a sampling address setting unit of the programmable controller according to the embodiment;

FIG. 11 is a functional block diagram of a programmable controller according to a modification.

DETAILED DESCRIPTION OF THE INVENTION

Embodiment

An embodiment of one aspect will be described first in outline. The embodiment relates to a programmable controller for input and output of a signal based on a sequence program that stores a signal value at an arbitrary position in a tracing memory.

Figure 1:
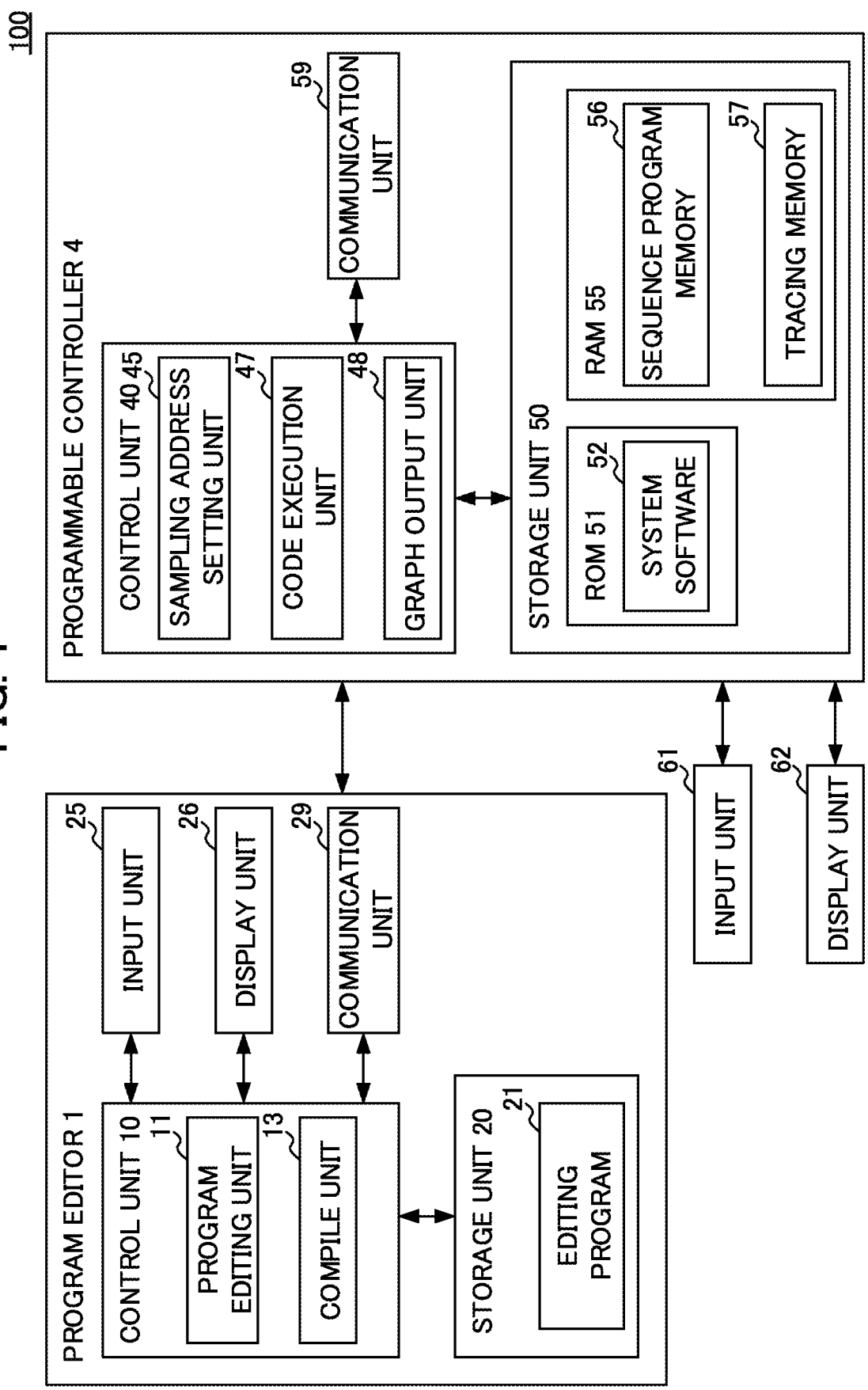
FIG. 1 is a functional block diagram of a sequence program processor according to an embodiment.

The configuration of a sequence program processor 100 according to the embodiment will be described next by referring to FIG. 1. The sequence program processor 100 shown in FIG. 1 includes a program editor 1 and a programmable controller 4. In the sequence program processor 100, the program editor 1 sets a pair of a trace start position and a trace end position in a sequence program and then generates an object code of the sequence program. The programmable controller 4 executes the object code of the sequence program and stores a signal value from the trace start position to the trace end position in a tracing memory. Further, the programmable controller 4 generates a trace graph relating to the signal value stored in the tracing memory.

As a result, the sequence program processor 100 makes a signal state traceable at an arbitrary position in the sequence program through the implementations of the processes by the program editor 1 and the programmable controller 4. The program editor 1 and the programmable controller 4 are connected in a manner allowing communication therebetween by being connected through a network, for example, or connected directly through a connection interface.

Program Editor 1

The program editor 1 edits a sequence program and compiles the edited sequence program. In this way, the edited sequence program is converted to an object code of the sequence program. The program editor 1 may be any terminal device such as a personal computer (PC), a tablet terminal, or a smartphone, for example.

The program editor 1 includes a control unit 10, a storage unit 20, an input unit 25, a display unit 26, and a communication unit 29. The control unit 10 may be a central processing unit (CPU). The control unit 10 executes various programs for controlling the program editor 1 stored in the storage unit 20, thereby controlling the program editor 1 in a centralized manner. The control unit 10 includes a program editing unit 11 and a compile unit 13. These functional units are realized by the execution of a program in the storage unit 20 by the control unit 10.

The program editing unit 11 sets a pair of a trace start position and a trace end position in the sequence program. For example, the program editing unit 11 is capable of setting one or more pairs on the basis of a commanding input of a trace start position and a trace end position given from the input unit 25.

The compile unit 13 analyzes an address of an instruction between a trace start position and a trace end position for each pair of the trace start positions and the trace end positions set by the program editing unit 11. Next, the compile unit 13 inserts a transfer instruction to the tracing memory into an interval before a subsequent net. When analyzing the address of the instruction between the trace start position and the trace end position, the compile unit 13 sets the analyzed address in a sampling address table.

Then, the compile unit 13 converts the sequence program to an object code of the sequence program containing an execution program and the sampling address table. When inserting the transfer instruction to the tracing memory into the interval before the subsequent net, the compile unit 13 may further insert a control condition for the execution or stopping of the transfer instruction to the tracing memory in order to execute or stop a tracing function, as will be described later.

The storage unit 20 is a storage region for storing a program, etc. to be executed by the control unit 10. The storage unit 20 stores an editing program 21 for executing the foregoing functions of the control unit 10. The storage unit 20 has a temporary storage region for storing the object code of the sequence program generated by the control unit 10, for example.

The input unit 25 is an input unit such as a keyboard, a mouse, and various types of buttons such as a switch button, for example. The display unit 26 is a display unit and configured using a cathode ray tube (CRT) or a liquid crystal display (LCD), for example. The input unit 25 and the display unit 26 may be integrated into a touch panel. The communication unit 29 is a communication control device configured using a predetermined connector such as an RS232C connector, for example, and is for making a direct connection to the programmable controller 4.

Programmable Controller 4

The programmable controller 4 is a device that executes a program such as system software used for tracing of a sequence program and inputs and outputs signals according to the object code of the sequence program. The programmable controller 4 includes a control unit 40, a storage unit 50, and a communication unit 59. The control unit 40 may be a CPU. The control unit 40 executes various programs for controlling the programmable controller 4 stored in the storage unit 50, thereby controlling the programmable controller 4 in a centralized manner. The control unit 40 includes a sampling address setting unit 45, a code execution unit 47, and a graph output unit 48. These functional units are realized by the execution of a program in the storage unit 50 by the control unit 40.

The sampling address setting unit 45 analyzes a sampling address table contained in the object code of the sequence program and sets a sampling address in a tracing memory 57 described later. The code execution unit 47 executes the object code of the sequence program. By doing so, in accordance with a transfer instruction about transferring a signal value to the tracing memory 57, the acquired signal value is stored in the tracing memory 57. The graph output unit 48 outputs a trace result as a trace graph containing the signal value stored in the tracing memory 57 to a display unit 62 described later.

The storage unit 50 is a storage region for storing a program, etc. to be executed by the control unit 40. The storage unit 50 includes at least a read only memory (ROM) 51 and a random access memory (RAM) 55. The ROM 51 stores system software 52. The system software 52 is a program for executing the foregoing functions of the control unit 40.

The RIM 55 is a region for storing temporary calculation data and display data, and various types of data, etc. input through an input unit 61 by an operator. The RAM 55 is a storage region containing a sequence program memory 56 and the tracing memory 57. The sequence program memory 56 is a region for storing the object code of the sequence program generated by the program editor 1. The tracing memory 57 is a region for setting a sampling address based on the sampling address table contained in the object code of the sequence program.

The communication unit 59 is a communication control device configured using a predetermined connector such as an RS232C connector, for example, and is for making a direct connection to the program editor 1, the input unit 61, the display unit 62, etc. The programmable controller 4 includes processing units specific to the programmable controller 4 in addition to the foregoing functional units. These processing units are publicly known to persons skilled in the art and will not be described accordingly.

The input unit 61 is a manual data input unit such as a keyboard of a display/MDI unit, for example. The display unit 62 is a display of the display/MDI unit, for example.

Program Editing Process

Described next is a process (process of editing a sequence program and generating an object code of the sequence program in which a signal value is traceable at an arbitrary position) performed by the sequence program processor 100 of the embodiment. First, a process performed by the program editor 1 will be described on the basis of FIG. 2. FIG. 2 is a flowchart showing a program editing process performed by the program editor 1.

Figure 3A:
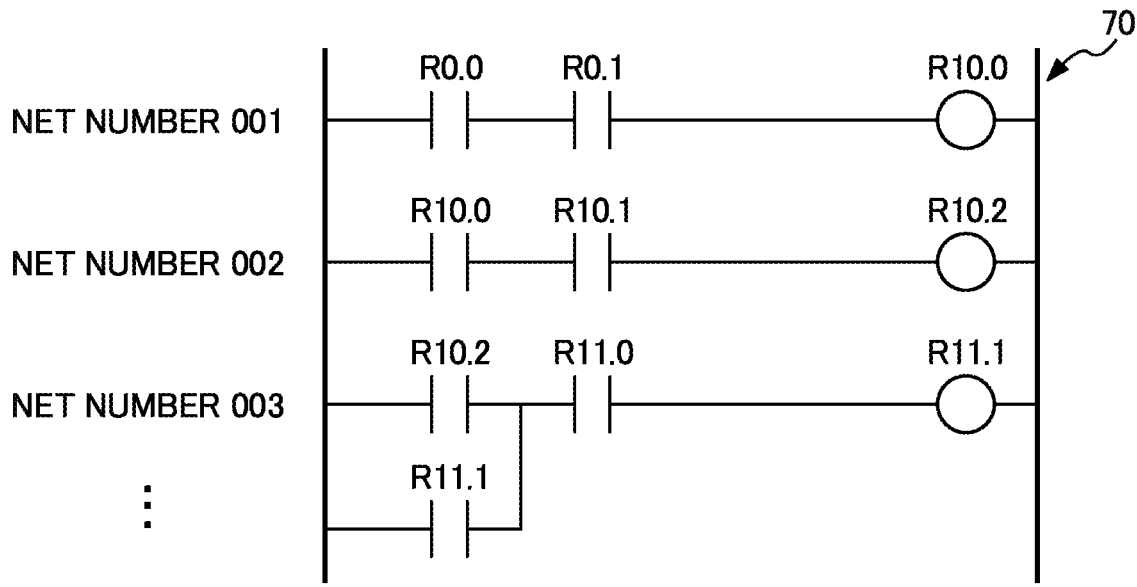
FIG. 3A shows an example of a ladder used in describing a process performed by the program editor according to the embodiment.

In step S11 (in the following, step S will simply be called S), the control unit 10 (program editing unit 11) of the program editor 1 accepts specification of a trace start position and a trace end position specified in such a manner that a component belonging to components of a sequence program and becoming a trace target is within a trace target zone. As illustrated in FIG. 3A, for example, the sequence program can be expressed in the form of a ladder diagram. First, the control unit 10 displays a ladder 70 shown in FIG. 3A on the display unit 26. The ladder 70 contains one or more nets each composed of a ladder circuit. Each net is given a net number. The nets contain components (instructions) such as a contact point (reference signal) and a coil (update signal).

Figure 3B:
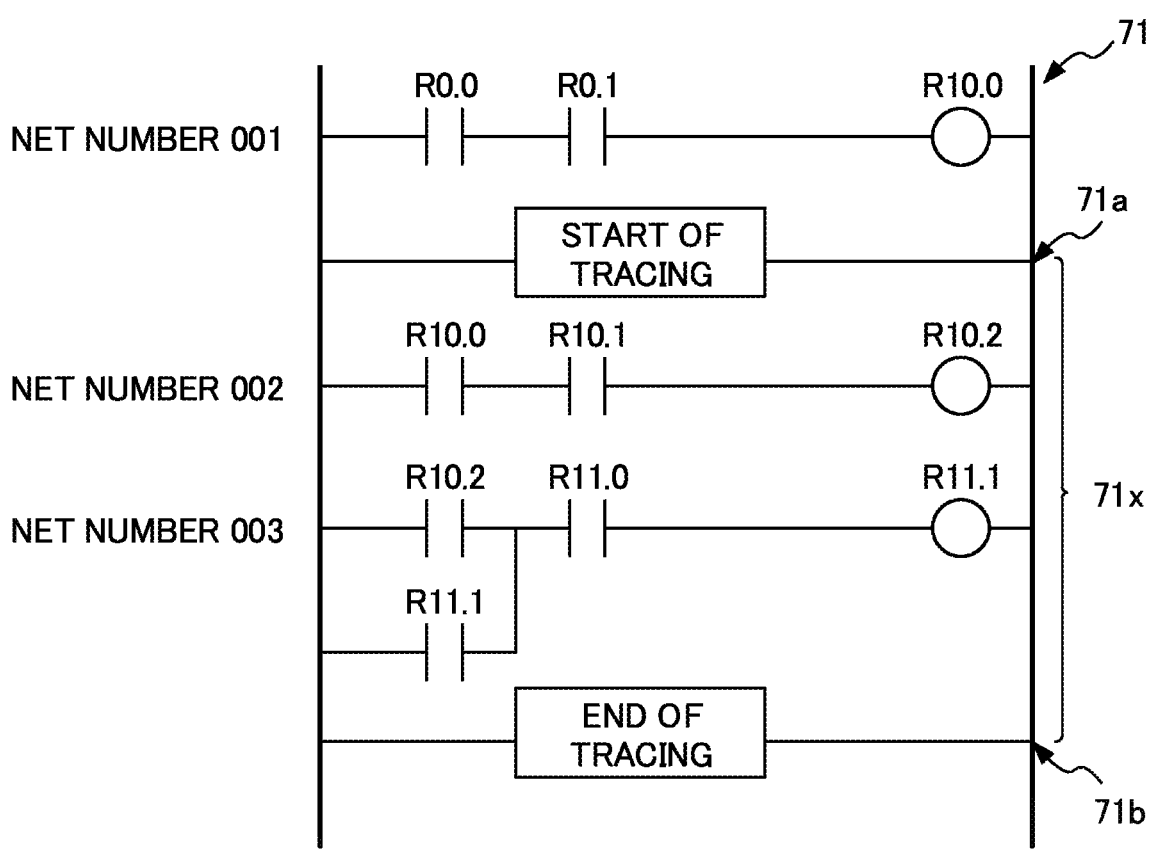
FIG. 3B shows an example of a ladder after the implementation of a process by a program editing unit of the program editor according to the embodiment.

Then, the control unit 10 accepts input through the input unit 25 from an operator such as a program editor to accept specification of a pair of a trace start position and a trace end position through the input unit 25. FIG. 3B shows a ladder 71 resulting from the setting of a trace start position 71*a* and a trace end position 71*b* for the ladder 70 shown in FIG. 3A. The ladder 71 shows that a zone 71*x* between the trace start position 71*a* and the trace end position 71*b* is a trace target zone defined as a trace target in the sequence program. Then, the control unit 10 stores the edited sequence program shown as the ladder 71 into the storage unit 20.

In S12 of FIG. 2, on the basis of the sequence program containing the trace start position and the trace end position specified in S11, the control unit 10 (compile unit 13) analyzes an address of an instruction between the trace start position and the trace end position. Regarding the ladder 71 in FIG. 3B, components on each net identified by a net number 002 and a net number 003 contained in the zone 71*x* become targets of address analysis.

Figure 4:
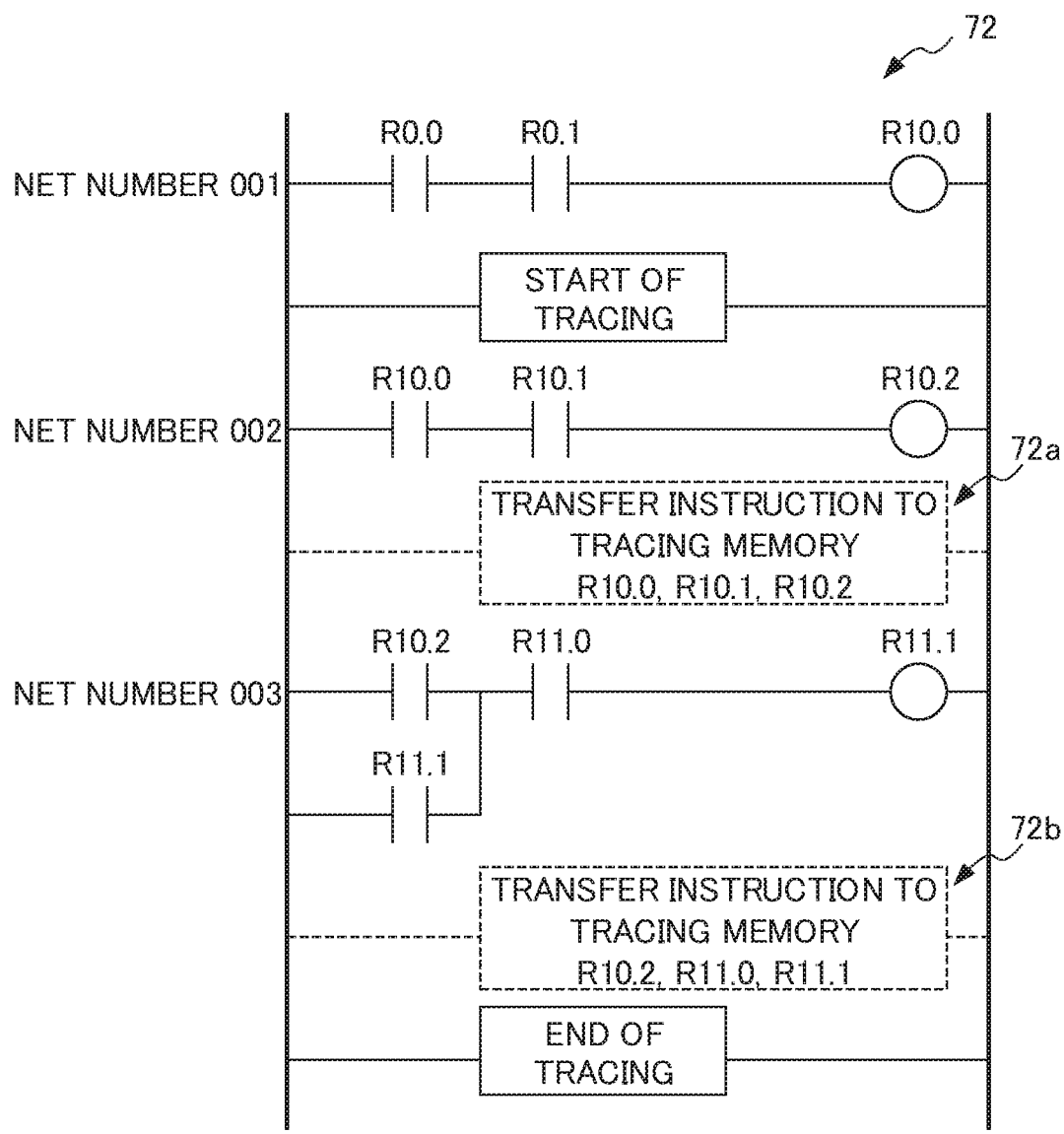
FIG. 4 shows an example of a ladder after the implementation of a process by a compile unit of the program editor according to the embodiment.

In S13 of FIG. 2, the control unit 10 (compile unit 13) inserts a transfer instruction to the tracing memory into an interval before a subsequent net. FIG. 4 shows an example of a ladder 72 into which the transfer instruction to the tracing memory is inserted between nets. An additive element 72*a*, which is a transfer instruction to the tracing memory corresponding to the net number 002 after the trace start position, is inserted between the net number 002 and the net number 003, which is the subsequent net number. Likewise, an additive element 72*b*, which is a transfer instruction to the tracing memory corresponding to the net number 003, is inserted before the trace end position.

Figure 5A:
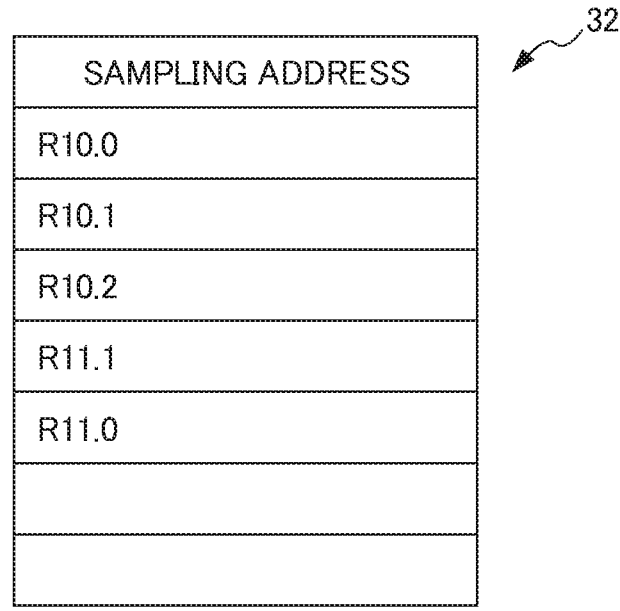
FIG. 5A shows an example of a sampling address table set by the process performed by the program editor according to the embodiment.

In S14 of FIG. 2, the control unit 10 (compile unit 13) provides a sampling address table in the storage unit 20 and sets the address analyzed in S12 in the provided sampling address table. FIG. 5A shows examples of sampling addresses set in a sampling address table 32. For example, the net number 002 shown in FIG. 4 relates to three addresses R10.0, R10.1, and R10.2. Further, the net number 003 relates to three addresses R10.2, R11.0, and R11.1. The address R11.1 is present at two positions. Like in this case, if there is duplication of the same address, the control unit 10 avoids repeated registration and sets the address only once.

Figure 5B:
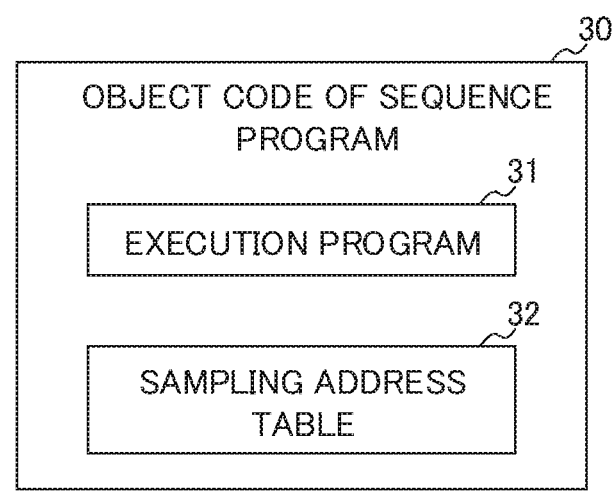
FIG. 5B is a block diagram of an object code of a sequence program generated by the process performed by the program editor according to the embodiment.

In S15 of FIG. 2, the control unit 10 (compile unit 13) performs a compile process to generate an object code of the sequence program and stores the generated object code into the storage unit 20. Then, the control unit 10 finishes the flow of the processes. FIG. 5B is a block diagram of a generated object code 30 of the sequence program. As shown in FIG. 5B, the object code 30 of the sequence program includes an execution program 31 indicating the ladder 72 and the sampling address table 32 set in S14 of FIG. 2.

The object code 30 of the sequence program generated by the program editor 1 is delivered to the programmable controller 4 and stored into the sequence program memory 56 of the programmable controller 4. The object code 30 of the sequence program can be delivered between the communication unit 25 of the program editor 1 and the communication unit 59 of the programmable controller 4, for example.

Tracing Process

A process (process of executing the object code 30 of the sequence program generated by the program editor 1 and sampling a signal value at a specified position) performed by the programmable controller 4 will be described next on the basis of FIG. 6A. FIG. 6A is a flowchart showing a tracing process performed by the programmable controller 4. In FIG. 6A, the control unit 40 of the programmable controller 4 executes the object code 30 of the sequence program generated by the program editor 1 in accordance with the system software 52 stored in the ROM 51.

In S21, the control unit 40 (sampling address setting unit 45) analyzes the sampling address table 32 contained in the object code 30 of the sequence program stored in the sequence program memory 56. Then, the control unit 40 (sampling address setting unit 45) sets a sampling address in the tracing memory 57. FIG. 7 shows an example of the tracing memory 57 in which sampling addresses are set on the basis of the sampling address table 32. As shown in FIG. 7, the tracing memory 57 is a table configured to be capable of storing respective signal values of the addresses in the order of execution (order of scanning).

Figure 8:
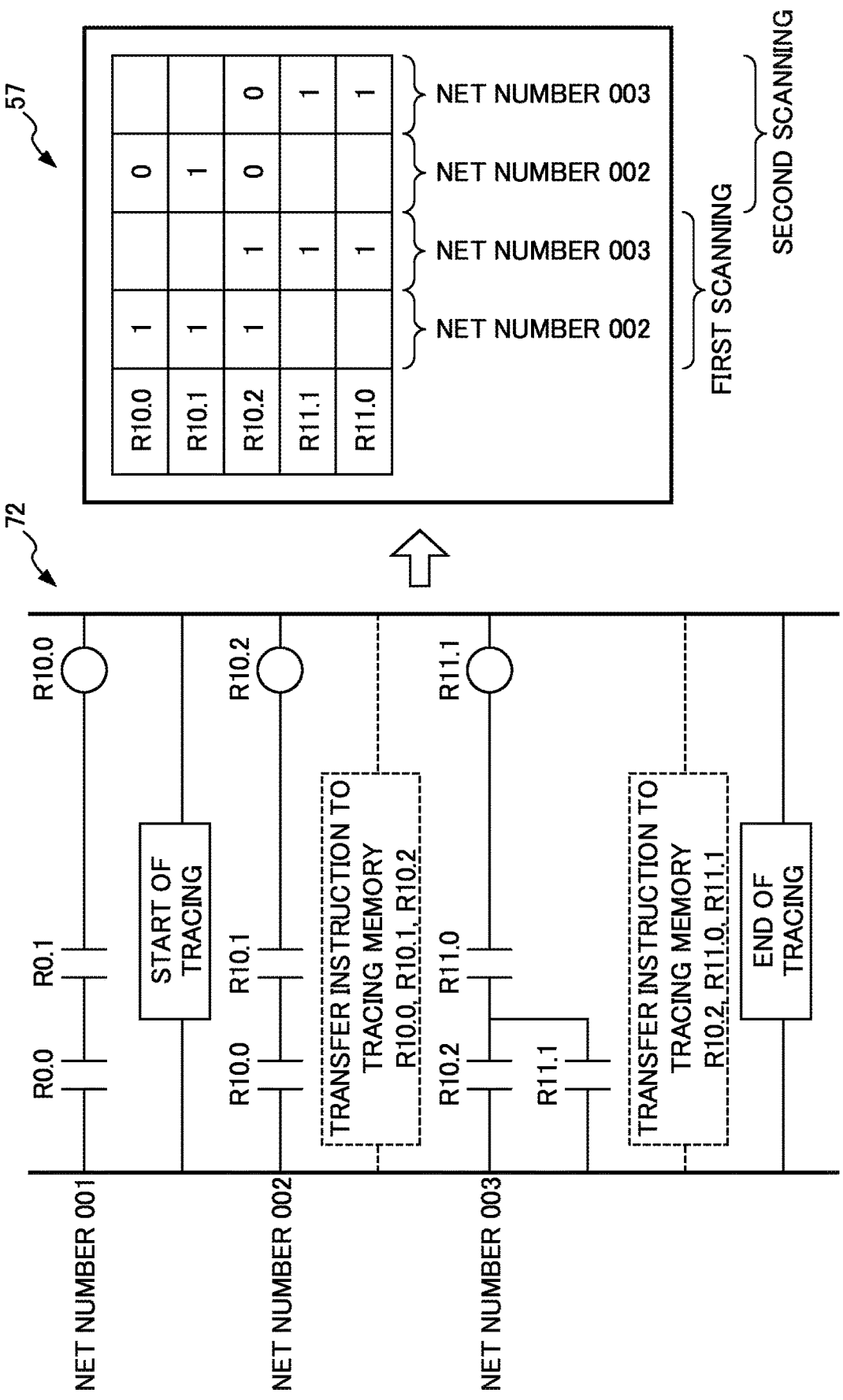
FIG. 8 is a view for describing a process performed by a code execution unit of the programmable controller according to the embodiment.

In S22 of FIG. 6A, the control unit 40 (code execution unit 47) executes the object code 30 of the sequence program. By doing so, in accordance with a transfer instruction about transferring a signal value to the tracing memory 57, the signal value (signal state) is stored in the tracing memory 57. FIG. 8 shows how respective signal values of addresses are stored in the tracing memory 57 according to the execution program 31 corresponding to the ladder 72. A signal value 1 means ON and a signal value 0 means OFF. Signal values resulting from the second scanning are shown in FIG. 8. As long as no instruction for interruption, for example, is given from outside, the control unit 40 performs the process for third scanning and subsequent scanning to store respective signal values of addresses in the same way as in the process up to the second scanning. The control unit 40 continues tracing at all times during the execution of the object code 30 of the sequence program.

Trace Graph Output Process

Figure 9:
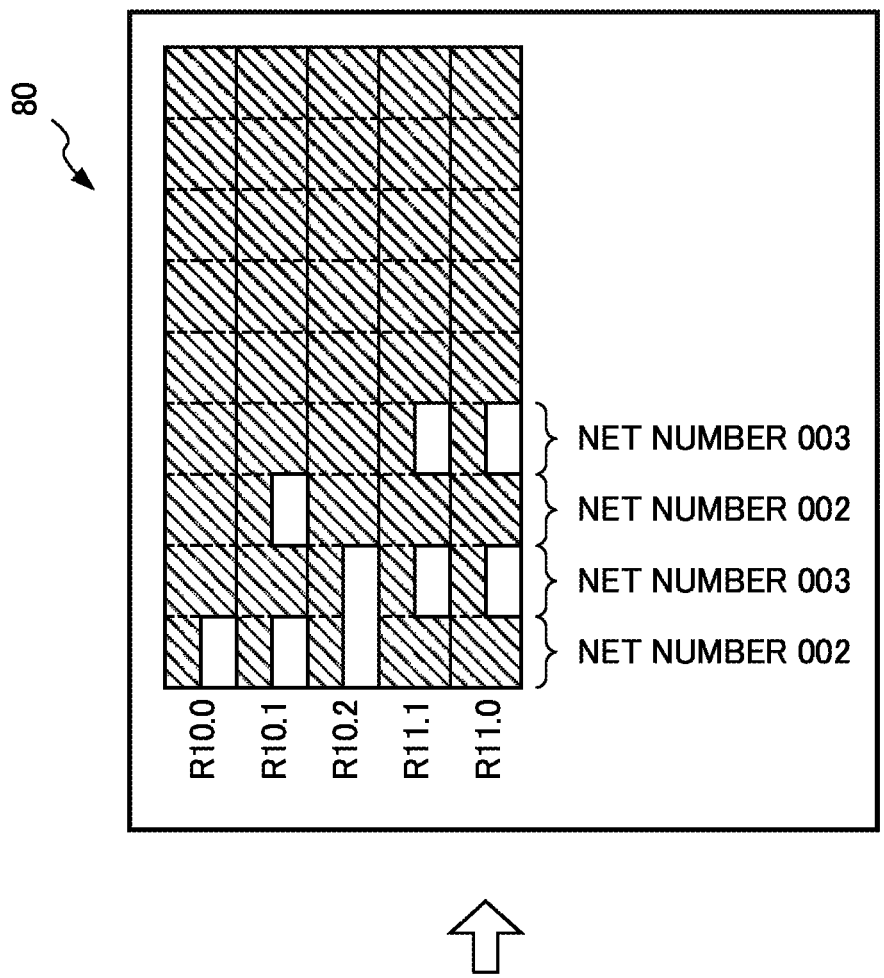
FIG. 9 is a view for describing a process performed by a graph output unit of the programmable controller according to the embodiment.

A trace graph output process performed by the programmable controller 4 will be described next on the basis of FIG. 6B. If there arises a need to check the substance of a signal value of an address stored in the tracing memory 57, the control unit 40 (graph output unit 48) of the programmable controller 4 first generates a trace graph in S31 of FIG. 6B on the basis of a storage result about the signal values stored in the tracing memory 57. FIG. 9 shows an example of a trace graph 80 generated on the basis of the signal values in the tracing memory 57. The trace graph 80 shows a case where the signal is ON (namely, with a signal value 1) in white and a case where the signal is OFF (namely, with a signal value other than 1) in black (other than white). The trace graph 80 is shown as an example, and indications in white and black may be reversed.

Next, in S32 of FIG. 6B, the control unit 40 (graph output unit 48) outputs the generated trace graph 80 to the display unit 62. By doing so, the trace graph 80 is displayed on the display unit 62.

As described above, in the sequence program processor 100, the program editor 1 edits a sequence program in such a manner as to incorporate specification of the trace start position 71a and the trace end position 71b into the sequence program. As a result, the zone 71x is set as a trace target zone in the sequence program. Then, the program editor 1 analyzes an address of a component in the zone 71x, inserts a transfer instruction about transferring a signal value to the tracing memory 57, and sets the analyzed address in the sampling address table 32. The program editor 1 thereafter generates the object code 30 of the sequence program containing the execution program 31 and the sampling address table 32.

The programmable controller 4 loads the object code 30 of the sequence program generated by the program editor 1 into the sequence program memory 56 and then executes the object code 30 of the sequence program generated by the program editor 1 in accordance with the system software 52. By doing so, the object code 30 of the sequence program is executed by the programmable controller 4. As a result, a signal value of an instruction in the trace target zone is set in the tracing memory 57.

As a result, the sequence program processor 100 makes a signal value between a start position and an end position in a sequence program specified by a user traceable to allow the sampling of a necessary signal value. Further, the sequence program processor 100 allows sampling on the occurrence of signal change in the sequence program. Further, the sequence program processor 100 can avoid extension of the cycle time of the sequence program.

The programs used in the embodiment can be stored using various types of non-transitory computer-readable media and can be supplied to a computer. The non-transitory computer-readable media include various types of tangible storage media. Examples of the non-transitory computer-readable media include a magnetic storage medium (a flexible disk, magnetic tape, or a hard disk drive, for example), a magneto-optical storage medium (an magneto-optical disk, for example), a CD read-only memory (CD-ROM), a CD-R, a CD-R/W, and a semiconductor memory (a mask ROM, a programmable ROM (PROM), an erasable PROM (EPROM), a flash ROM, or a random access memory (RAM), for example). The programs can also be supplied to the computer using various types of transitory computer-readable media. Examples of the transitory computer-readable media include electrical signals, optical signals, and electromagnetic waves. The transitory computer-readable media can be used for supplying the programs to a computer through wired communication paths such as electrical wires and optical fibers or wireless communication paths.

While the foregoing embodiment is a preferred embodiment of the present invention, the scope of the present invention is not limited only to the foregoing embodiment, and the present invention can be implemented with embodiments to which various changes are made within a range not deviating from the substance of the present invention.

First Modification

Figure 10:
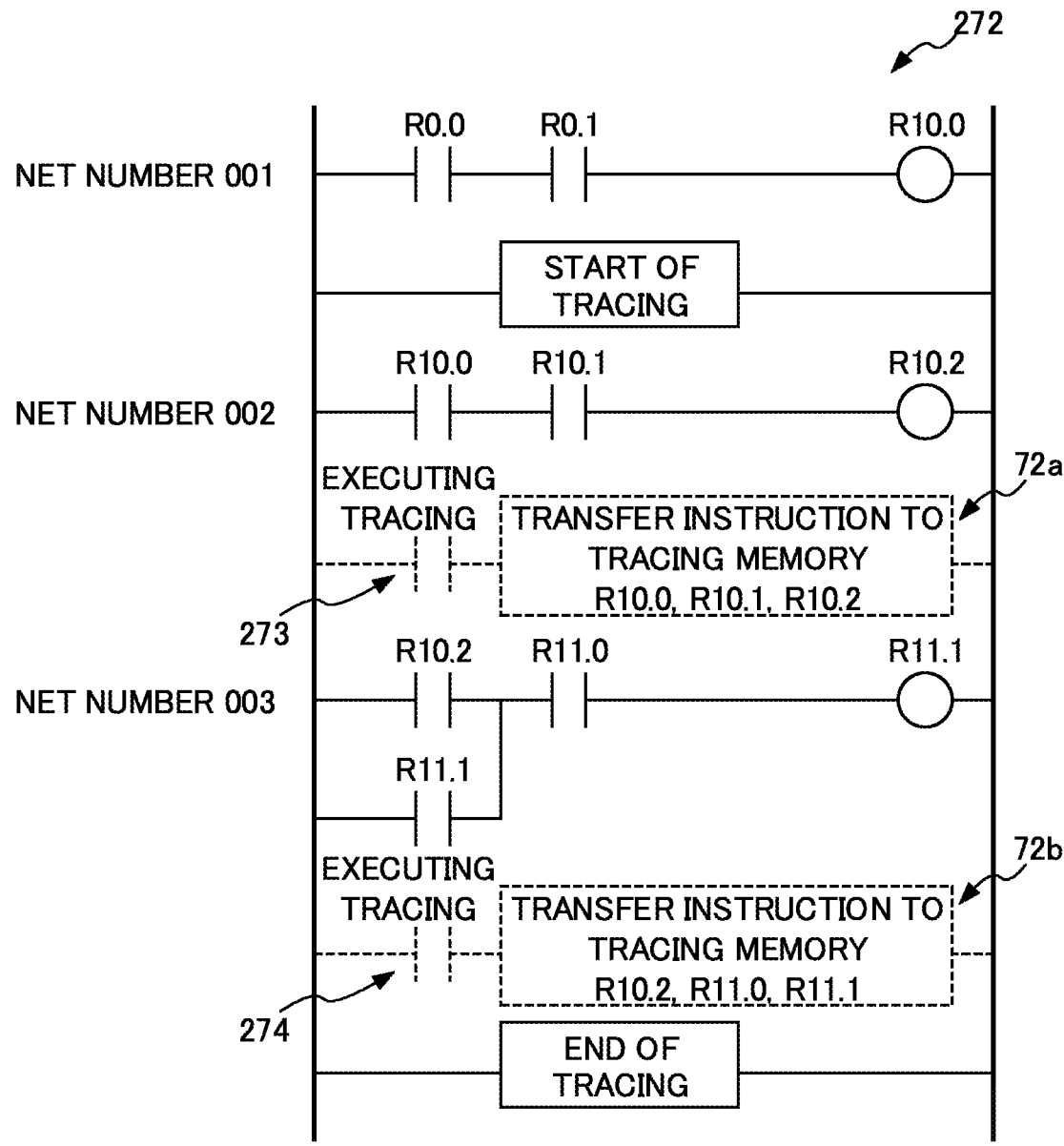
FIG. 10 shows an example of a ladder after the implementation of a process by a compile unit of a program editor according to a modification.

The foregoing embodiment has been described by giving an example that, when the sequence program processor 100 executes an object code of a sequence program, transfer instructions about transferring signal values to the tracing memory are executed sequentially to store the signal values order in the tracing memory. However, the embodiment is not limited to this example. For example, the control unit 10 (compile unit 13) of the program editor 1 may insert a control condition for the execution or stopping of a transfer instruction about transferring a signal value to the tracing memory in order to execute or stop the tracing function. A ladder 272 shown in FIG. 10 contains a control condition 273 and a control condition 274 for executing tracing inserted before the additive elements 72a and 72b, respectively, as transfer instructions to the tracing memory. By doing so, signal states of the control conditions 273 and 274 are changed in response to input through the input unit 61, for example, and this makes it possible to control the execution of the additive elements 72a and 72b.

Second Modification

The foregoing embodiment has been described by giving an example that the sequence program processor 100 includes a program editor 1 and a programmable controller 4. However, the embodiment is not limited to this example.

The programmable controller 4 may include the program editor 1. More specifically, the programmable controller 4 may have all the functions of the program editor 1.

FIG. 11 is a block diagram of a programmable controller 200 including a programmable controller 204 having the functions of the program editor 1. The programmable controller 204 includes a control unit 240, a storage unit 250, and the communication unit 59. The control unit 240 includes a program editing unit 241, a compile unit 243, the sampling address setting unit 45, the code execution unit 47, and the graph output unit 48. The program editing unit 241 and the compile unit 243 have functions comparable to those of the program editing unit 11 and the compile unit 13 of the program editor 1 shown in FIG. 1.

The storage unit 250 includes a ROM 251 and the RAM 55. The ROM 251 stores system software 252. The system software 252 contains a program for the implementation of a process comparable to that of the editing program 21 in the program editor 1 shown in FIG. 1 and the system software 52 of the programmable controller 4. By doing so, even the programmable controller 204 having a program editing function and being used alone can still achieve functions comparable to those of the foregoing embodiment.

Third Modification

The foregoing embodiment has been described by giving an example that a program of a ladder system is used as a sequence program. However, the embodiment is not limited to this example. For example, a sequence program of a different system such as a sequential function chart (SFC) system may be used, for example.

Fourth Modification

The foregoing embodiment has been described by giving an example that a trace result is displayed on the display unit 62. However, the embodiment is not limited to this example. The trace result may be output as data to a file.

Fifth Modification

The foregoing embodiment has been described by giving an example that one pair of a trace start position and a trace end position is set. However, the embodiment is not limited to this example. Two or more pairs, each having a trace start position and a trace end position, may be set.

As described above, the embodiment achieves the following working effects, for example.

(1) The sequence program processor 100 executes the object code 30 of a sequence program stored in the sequence program memory 56. The sequence program processor 100 includes the program editor 1 and the programmable controller 4. The program editor 1 includes: the program editing unit 11 capable of setting a pair of a trace start position and a trace end position in the sequence program; and the compile unit 13 that analyzes an address of an instruction between the trace start position and the trace end position set by the program editing unit 11, inserts a transfer instruction about transferring a signal value to the tracing memory 57, and sets the analyzed address in the sampling address table 32, thereby converting the sequence program to the object code 30 of the sequence program containing the execution program 31 and the sampling address table 32. The programmable controller 4 includes: the sampling address setting unit 45 that sets a sampling address in the tracing memory 57 on the basis of the sampling address table 32 contained in the object code 30 of the sequence program resulting from the conversion by the compile unit 13; and the code execution unit 47 that executes the object code 30 of the sequence program and stores the signal value in the tracing memory 57 in accordance with the transfer instruction. As a result, the signal value between the start position and the end position in the sequence program becomes traceable using the two devices including the program editor 1 and the programmable controller 4, allowing the sampling of a necessary signal value through the simple setting.

(2) In the sequence program processor 100 described in (1), the program editing unit 11 may set the pair on the basis of a commanding input for setting and may be capable of setting a plurality of the pairs. This allows a user to set a plurality of the pairs to allow the sampling of a signal value of an instruction in each trace target zone defined by the pairs.

(3) In the sequence program processor 100 described in (1) or (2), the compile unit 13 may insert the transfer instruction into an interval before a subsequent net. This allows the sampling of a signal value of an instruction before the instruction of the subsequent net is executed.

(4) In the sequence program processor 100 described in any one of (1) to (3), the compile unit 13 may further insert a control condition for the transfer instruction. This makes it possible to control the start or stop of the sampling of a signal value in response to input through the input unit 61.

(5) In the sequence program processor 100 described in any one of (1) to (4), the programmable controller 4 may include the graph output unit 48 that outputs a trace result as a trace graph containing the signal value stored in the tracing memory 57 by the code execution unit 47. This makes it possible to present a signal value of an instruction in an easily visible manner as the trace graph.

(6) In the sequence program processor 100 described in any one of (1) to (5), the programmable controller 204 may include the program editor 1. This makes it possible to achieve an effect comparable to that described in (1) using only the programmable controller 204.

EXPLANATION OF REFERENCE NUMERALS

1 Program editor
4, 204 Programmable controller
10, 40, 240 Control unit
11, 241 Program editing unit
13, 243 Compile unit
20, 50, 250 Storage unit
21 Editing program
30 Object code of sequence program
31 Execution program
32 Sampling address table
45 Sampling address setting unit
47 Code execution unit
48 Graph output unit
52, 252 System software
56 Sequence program memory
57 Tracing memory
62 Display unit
100, 200 sequence program processor

What is claimed is:

1. A sequence program processing device that executes an object code of a sequence program stored in a program memory, the sequence program processing device comprising:
a program editor; and
a programmable controller, the program editor comprising:

a program editing unit capable of setting a pair of a trace start position and a trace end position in the sequence program; and a compile unit that analyzes an address of an instruction between the trace start position and the trace end position set by the program editing unit, inserts a transfer instruction about transferring a signal value to a tracing memory, and sets the analyzed address in a sampling address table, thereby converting the sequence program to the object code of the sequence program containing an execution program and the sampling address table, the programmable controller comprising:

a sampling address setting unit that sets a sampling address in the tracing memory based on the sampling address table contained in the object code of the sequence program resulting from the conversion by the compile unit; and a code execution unit that executes the object code of the sequence program and stores the signal value in the tracing memory in accordance with the transfer instruction.

2. The sequence program processing device according to claim 1, wherein the program editing unit sets the pair based on a commanding input for setting and is capable of setting a plurality of the pairs.

3. The sequence program processing device according to claim 1, wherein the compile unit inserts the transfer instruction into an interval before a subsequent net.

4. The sequence program processing device according to claim 1, wherein the compile unit further inserts a control condition for the transfer instruction.

5. The sequence program processing device according to claim 1, wherein the programmable controller comprises:

a graph output unit that outputs a trace result as a trace graph containing the signal value stored in the tracing memory by the code execution unit.

6. The sequence program processing device according to claim 1, wherein the programmable controller comprises the program editor.

* * * * *